(12) United States Patent
Ohno et al.

(10) Patent No.: US 8,984,646 B2
(45) Date of Patent: Mar. 17, 2015

(54) CONTENT TRANSMISSION DEVICE AND CONTENT RECEPTION DEVICE

(75) Inventors: Chiyo Ohno, Chigasaki (JP); Hiroo Okamoto, Yokohama (JP)

(73) Assignee: Hitachi Maxell, Ltd., Osaka (JP)

( * ) Notice: Subject to any disclaimer, the term of this patent is extended or adjusted under 35 U.S.C. 154(b) by 508 days.

(21) Appl. No.: 12/746,876

(22) PCT Filed: Feb. 16, 2009

(86) PCT No.: PCT/JP2009/052504
§ 371 (c)(1),
(2), (4) Date: Jun. 8, 2010

(87) PCT Pub. No.: WO2009/116338
PCT Pub. Date: Sep. 24, 2009

(65) Prior Publication Data
US 2010/0268955 A1 Oct. 21, 2010

(30) Foreign Application Priority Data
Mar. 17, 2008 (JP) ................................. 2008-066964

(51) Int. Cl.
*G06F 7/04* (2006.01)
*H04L 29/06* (2006.01)
(Continued)

(52) U.S. Cl.
CPC .......... *H04L 9/3273* (2013.01); *H04L 63/0428* (2013.01); *H04N 21/43615* (2013.01);
(Continued)

(58) Field of Classification Search
USPC ..................................................... 726/26, 29
See application file for complete search history.

(56) References Cited

U.S. PATENT DOCUMENTS

| 7,370,112 B2 | 5/2008 | Saito et al. |
| 7,644,265 B2 | 1/2010 | Kudo et al. |

(Continued)

FOREIGN PATENT DOCUMENTS

| EP | 1855440 A1 | 11/2007 |
| JP | 2004-180020 | 6/2004 |

(Continued)

OTHER PUBLICATIONS

Supplementary European Search Report EP 09 72 3087.4 dated Dec. 22, 2014.

*Primary Examiner* — Christopher Brown
(74) *Attorney, Agent, or Firm* — McDermott Will & Emery LLP

(57) ABSTRACT

A content reception equipment for accessing an in-home content transmission equipment from a remote place executes a first authentication process with the content transmission equipment in advance, executes the remote access information sharing process required for access from a remote place, and causes the information on the content reception equipment and the remote access information to be registered in an equipment information table of the content transmission equipment.
In the case where the in-home content transmission equipment is accessed by the content reception equipment brought out of home, the content transmission equipment transmits the content to the content reception equipment only in the case where the information on the content reception equipment is registered in the device information table of the content transmission equipment and the second authentication process using the remote access information is successfully executed between the content transmission equipment and the content reception equipment.

5 Claims, 18 Drawing Sheets

(51) Int. Cl.
*H04N 21/436* (2011.01)
*H04N 21/258* (2011.01)
*H04N 21/41* (2011.01)
*H04L 9/08* (2006.01)
*H04N 7/173* (2011.01)
*H04N 21/432* (2011.01)
*H04L 9/32* (2006.01)
*H04N 21/475* (2011.01)
*H04N 21/6334* (2011.01)
*H04N 21/4227* (2011.01)
*H04N 7/16* (2011.01)

(52) U.S. Cl.
CPC ..... *H04N21/25875* (2013.01); *H04N 21/4126* (2013.01); *H04L 9/0838* (2013.01); *H04N 7/17318* (2013.01); *H04N 21/4325* (2013.01); *H04L 2209/603* (2013.01); *H04N 7/17309* (2013.01); *H04L 63/08* (2013.01); *H04N 21/4753* (2013.01); *H04N 21/63345* (2013.01); *H04N 21/4227* (2013.01); *H04N 7/165* (2013.01)
USPC .............................................. 726/26; 726/29

(56) References Cited

U.S. PATENT DOCUMENTS

| | | |
|---|---|---|
| 2004/0158634 A1 | 8/2004 | Saito et al. |
| 2005/0160265 A1 | 7/2005 | Tanaka et al. |
| 2005/0160274 A1 | 7/2005 | Yukimatsu et al. |
| 2005/0198506 A1* | 9/2005 | Qi et al. ................... 713/170 |
| 2005/0210290 A1 | 9/2005 | Ono et al. |
| 2006/0051055 A1 | 3/2006 | Ohkawa |
| 2006/0265735 A1 | 11/2006 | Ohno |
| 2007/0192837 A1 | 8/2007 | Lee et al. |
| 2008/0168272 A1* | 7/2008 | Saito et al. ................ 713/171 |
| 2009/0327730 A1* | 12/2009 | Deishi ....................... 713/171 |

FOREIGN PATENT DOCUMENTS

| | | | |
|---|---|---|---|
| JP | 2005-005821 | | 1/2005 |
| JP | 2005-102021 | | 4/2005 |
| JP | 2005102021 | * | 4/2005 |
| JP | 2005-269288 | | 9/2005 |
| JP | 2007-220095 | | 8/2007 |

* cited by examiner

FIG.7

| | | 700 |
|---|---|---|
| MAX AUTHENTICATION NUMBER | | 34 — 701 |
| MAX COUNTER VALUE | | 1000 — 702 |
| MAX REMOTE ACCESS NUMBER | | 3 — 703 |

710

| ID (711) | DEVICE ID (712) | ADDRESS INFORMATION (EX: MAC ADDRESS) (713) | COUNTER VALUE (714) | REMOTE ACCESS KEY (715) | REMOTE ACCESS KEY LABEL (715A) | ACCESS SITUATION (716) |
|---|---|---|---|---|---|---|
| 0 | aabbccddee (DTV100) | AAAAA | 1000 | — | — | OFF — 721 |
| 1 | ffgghhiijj (PORTABLE PHONE 500) | BBBBB | 459 | *@$%**#!? | XXXXX | REMOTE — 722 |
| 2 | kkllmmnn (PC300) | CCCCC | 173 | — | — | IN HOME — 723 |
| ⋮ | ⋮ | ⋮ | ⋮ | ⋮ | | |
| 33 | | | | | | |

FIG. 10

| ID | ADDRESS INFORMATION 1001 | | REGISTRATION INFORMATION 1002 | | REMOTE ACCESS COMMON KEY 1003 |
|---|---|---|---|---|---|
| | MAC | IP | USER NAME | PASSWORD | |
| 0 | DDDDD | 133.144.XXX.YYY | Paul | ******** | *@$%**#1? |
| ⋮ | ⋮ | ⋮ | ⋮ | ⋮ | ⋮ |

1000

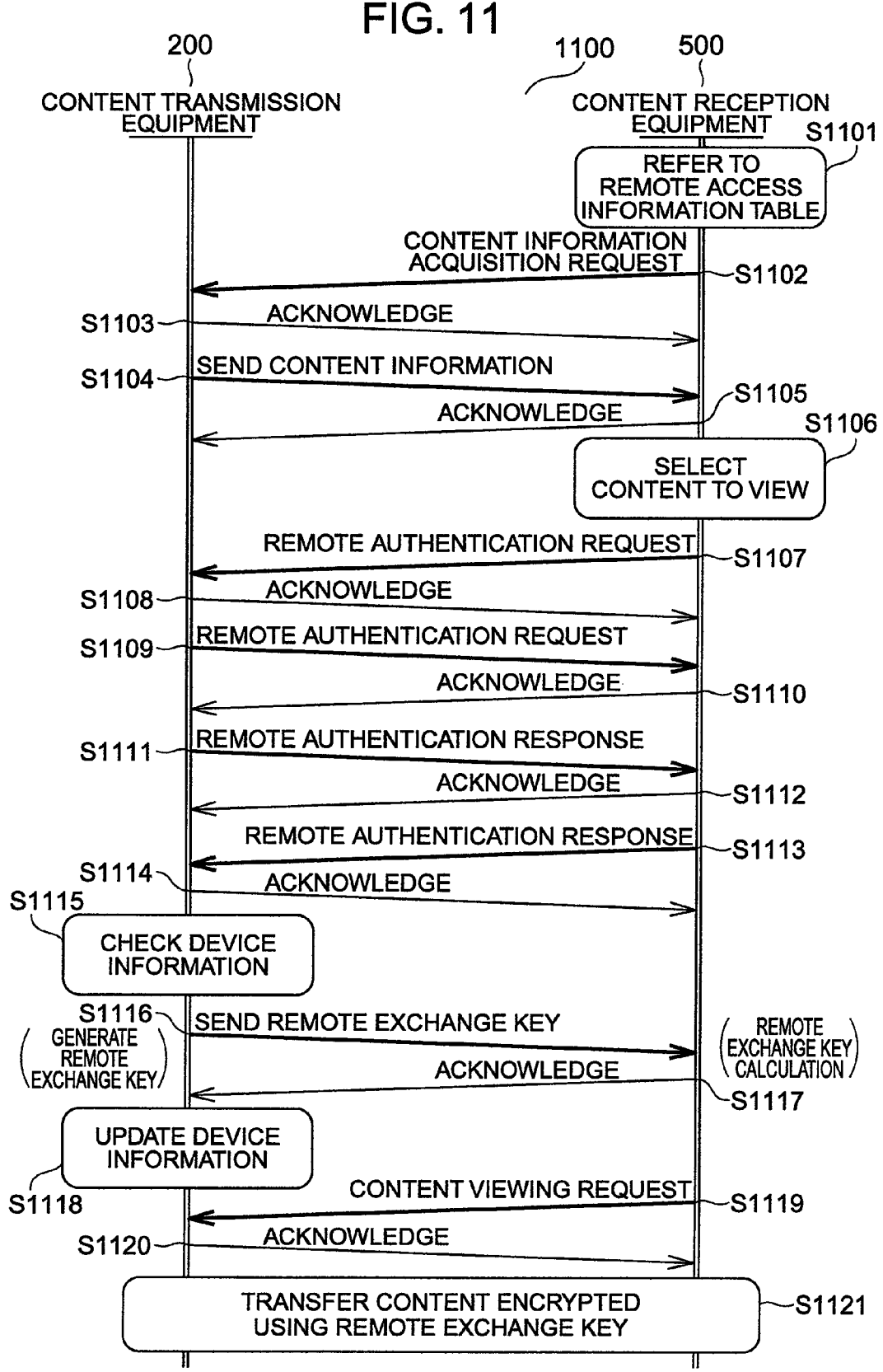

FIG. 12

| | 700 |
|---|---|
| MAX AUTHENTICATION NUMBER | 34 |
| MAX IN-HOME COUNTER VALUE | 1000 |
| MAX REMOTE ACCESS NUMBER | 3 |
| MAX REMOTE COUNTER VALUE | 1500 |

702 — MAX IN-HOME COUNTER VALUE
704 — MAX REMOTE COUNTER VALUE

710

| ID | DEVICE ID | ADDRESS INFORMATION (EX:MAC ADDRESS) | IN-HOME COUNTER VALUE | REMOTE ACCESS KEY | REMOTE ACCESS KEY LABEL | ACCESS SITUATION | REMOTE COUNTER VALUE |
|---|---|---|---|---|---|---|---|
| 0 | aabbccddee (DTV100) | AAAAA | 680 | — | — | IN HOME | — |
| 1 | ffgghhiiij (PORTABLE PHONE 500) | BBBBB | 459 | *@$%**#1? | xxxxx | REMOTE | 1500 |
| 2 | kkllmmnn (PC300) | CCCCC | 173 | — | — | OFF | — |
| ⋮ | ⋮ | ⋮ | ⋮ | ⋮ | ⋮ | ⋮ | ⋮ |
| 33 | | | | | | | |

717 — REMOTE COUNTER VALUE

FIG. 18

| | 700 |
|---|---|
| MAX AUTHENTICATION NUMBER | 34 |
| MAX IN-HOME COUNTER VALUE | 1000 |
| MAX REMOTE ACCESS NUMBER | 3 |
| MAX REMOTE COUNTER VALUE | 1500 |

710

| ID | DEVICE ID (712) | ADDRESS INFORMATION (EX:MAC ADDRESS) | IN-HOME COUNTER VALUE | REMOTE ACCESS KEY | REMOTE ACCESS KEY LABEL | ACCESS SITUATION | REMOTE COUNTER VALUE | SUBSTITUTE EQUIPMENT ID (718) |
|---|---|---|---|---|---|---|---|---|
| 0 | aabbccddee (DTV100) | AAAAA | 680 | — | — | IN HOME | — | — |
| 1 | ffgghhiijj (PORTABLE PHONE 500) | BBBBB | 459 | *@$%**#1? | xxxxx | REMOTE | 1500 | ooppqqrr (DTV600) |
| 2 | kkllmmnn (PC300) | CCCCC | 173 | — | — | OFF | — | — |
| ⋮ | ⋮ | ⋮ | ⋮ | ⋮ | ⋮ | ⋮ | ⋮ | ⋮ |
| 33 | | | | | | | | |

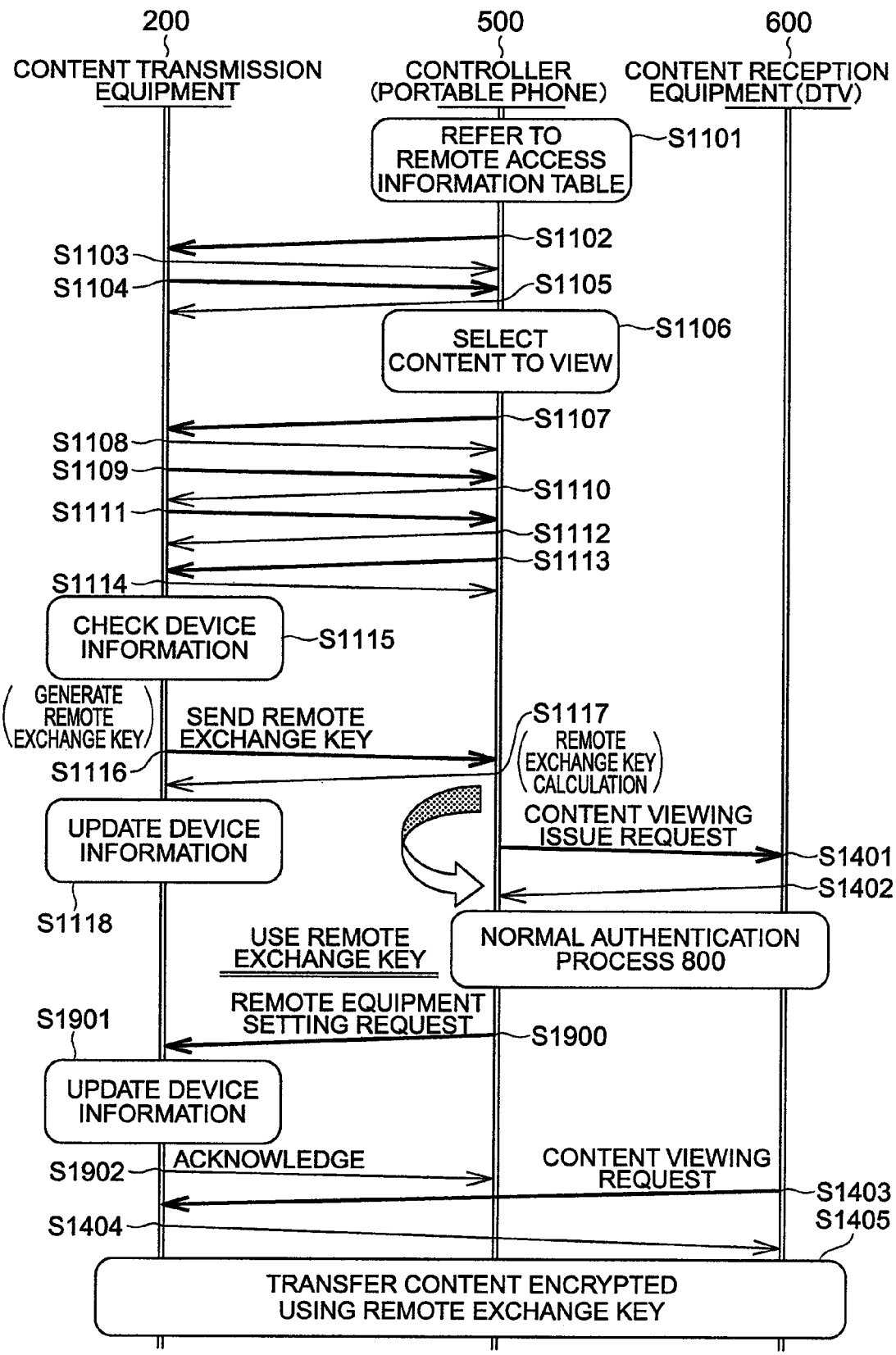

CONTENT TRANSMISSION DEVICE AND CONTENT RECEPTION DEVICE

RELATED APPLICATIONS

This application is the U.S. National Phase under 35 U.S.C. §371 of International Application No. PCT/JP2009/052504, filed on Feb. 16, 2009, which in turn claims the benefit of Japanese Application No. 2008-066964, filed on Mar. 17, 2008, the disclosures of which Applications are incorporated by reference herein.

TECHNICAL FIELD

This invention relates to a transmission equipment, a reception equipment and a content transmission method suitable for protection of the copyright of the contents of video and audio signals transmitted or received through a network.

BACKGROUND ART

With the progress of the processing ability including the computation speed and the storage capacity of the personal computer (hereinafter referred to as the PC), the capacity of the hard disk drive (hereinafter referred to as the HDD) built in the PC has increased. In this situation, even the PC of the rank used in an ordinary home has come to possess the ability to record a TV broadcast program using the HDD and permit the user to view the recorded program on the display of the PC.

As the result of recent development of the digital video signal processing technique, on the other hand, digital AV equipments such as a TV having a built-in digital tuner for receiving the digital broadcasting (hereinafter referred to as the DTV) and a digital recorder for recording/reproducing a digital broadcast program (for example, the HDD recorder, DVD recorder and the BD recorder) have been commercialized in succession.

Further, the extension of the broadband/internet has made it possible to mount a digital interface such as the wired/wireless LAN (Local Area Network), IEEE1394 or USB in the digital AV equipments and transmit the digital contents through a network.

Generally, in the case where the digitally recorded contents are recorded by transmission from one equipment to another through a network, etc. as described above, the data quality is degenerated less during transmission and a copy (duplicate) of the same quality as the contents in the equipment at the transmitting end can be generated at the receiving end. For the contents with the copyright thereof to be protected, therefore, a measure is required to prevent the illegal creation of a copy of the contents departing from the range of personal use.

In transmitting a content between digital AV equipments, for example, a copy protection method is employed in which the content is encrypted by the content transmission equipment, and the information for decryption is shared with the content reception equipment, so that even if the content is received correctly by an equipment other than the destination content reception equipment, the decryption of the content is prevented, thereby preventing the unlimited copy creation.

An example of the copy protection method employed for the digital AV equipments is a Digital Transmission Content Protection (DTCP) method specifying a method of copy protection on the IEEE1394 bus. In the DTCP method, the contents are managed by being classified into the categories of "copy free", "copy one generation" and "copy never". The recorder records only the contents in the category of "copy free" or "copy one generation", and the content in the category of "copy one generation", once recorded, is handled as "copy free". Except for the contents in the category of "copy free", all the contents are transmitted on a bus after being encrypted at the transmitting end to prevent the contents from being copied in an unlimited manner.

Also in the content transmission by wired or wireless LAN, a DTCP-IP method further strengthened in security is specified by extensively applying DTCP to the IP network. According to the DTCP-IP method, a technique is disclosed to define an in-home network to prevent the unlimited remote distribution of the contents with the copyright thereof to be protected such as a broadcast program recorded in home.

Patent Document 1: JP-A-2005-5821

DISCLOSURE OF THE INVENTION

Problem to be Solved by the Invention

The conventional technique described above incorporates the function to confirm that the equipments at the transmitting and receiving ends are both located inside the same home in the case where the contents requiring copyright protection are transmitted through the wired or wireless LAN.

The user having an equipment such a notebook-sized PC or a portable terminal used in a mobile environment, however, has a great desire to access the contents in his/her home using this equipment during a trip or from inside a tram car on his/her way to the working place.

Accordingly, it is an object of this invention to provide a content transmission equipment, a content reception equipment and a content transmission method in which the legal viewing of the contents transferred from an in-home equipment to a remote equipment can be limited to the range of personal use.

Means for Solving the Problem

In order to solve the problem described above, according to this invention, there is provided a content transmission equipment including:

first authentication means for mutually authenticating the content transmission equipment and a content reception equipment connected to an in-home network as legitimate equipments based on a first authentication protocol, and confirming that the content reception equipment is existing in home;

remote access information sharing means for sharing the information required for access from a remote place with the content reception equipment;

device information management means for holding and managing the information on the content reception equipment successfully authenticated by the first authentication means and the information shared by the remote access information sharing means;

second authentication means for mutually authenticating the content transmission equipment and the content reception equipment connected to the remote network as legitimate equipments based on a second authentication protocol using the information rendered sharable by the remote access information sharing means; and encryption means for encrypting the content transmitted to the content reception equipment using first key information rendered sharable with the content reception equipment as the result of the authentication process executed by the first authentication means or second key information rendered sharable as the result of the authentication process executed by the second authentication means;

wherein only in the case where the authentication process is successfully executed with the content reception equipment using the first authentication means, the remote access information required for access from a remote place is rendered sharable by the remote access information sharing means, and the information on the content reception equipment and the remote access information are registered using the device information management means; and wherein only in the case where the authentication process is successfully executed with the content reception equipment using the second authentication processing means, the content is encrypted using the encryption means and sent to the remote content reception equipment.

Advantages of the Invention

The normal authentication process and the equipment authentication process for remote access are executed in advance with a content transmission equipment in home, and the equipment authentication process for remote use is executed from a remote place only on the content reception equipment successfully subjected to the authentication processes, so that the in-home contents become viewable. As a result, the contents in home can be viewed by the legitimate user from a remote place without departing from the range of personal use for an improved user convenience.

The other objects, features and advantages of the invention will be made apparent by the following description of embodiments of the invention taken in conjunction with the accompanying drawings.

BRIEF DESCRIPTION OF THE DRAWINGS

FIG. 7 shows an example of a configuration of equipment information.

FIG. 10 shows an example of the configuration of a remote access information table held in a device information management unit of a content reception equipment and brought out to a remote place.

FIG. 11 shows an example of the sequence for executing the content transfer between an in-home content transmission equipment and a remote content reception equipment.

FIG. 12 shows an example of the configuration of the equipment information.

FIG. 18 shows an example of the configuration of the equipment information.

FIG. 19 shows an example of the sequence for content transfer from a remote content reception equipment to an in-home content transmission equipment.

BEST MODE FOR CARRYING OUT THE INVENTION

Embodiments of the invention are explained below.
Embodiment 1

The feature of this embodiment lies in that the illegal viewing/copy is prevented without departing from the range of personal use of the contents while at the same time making it possible to view the in-home contents on a remote content reception equipment.

Figure 1:
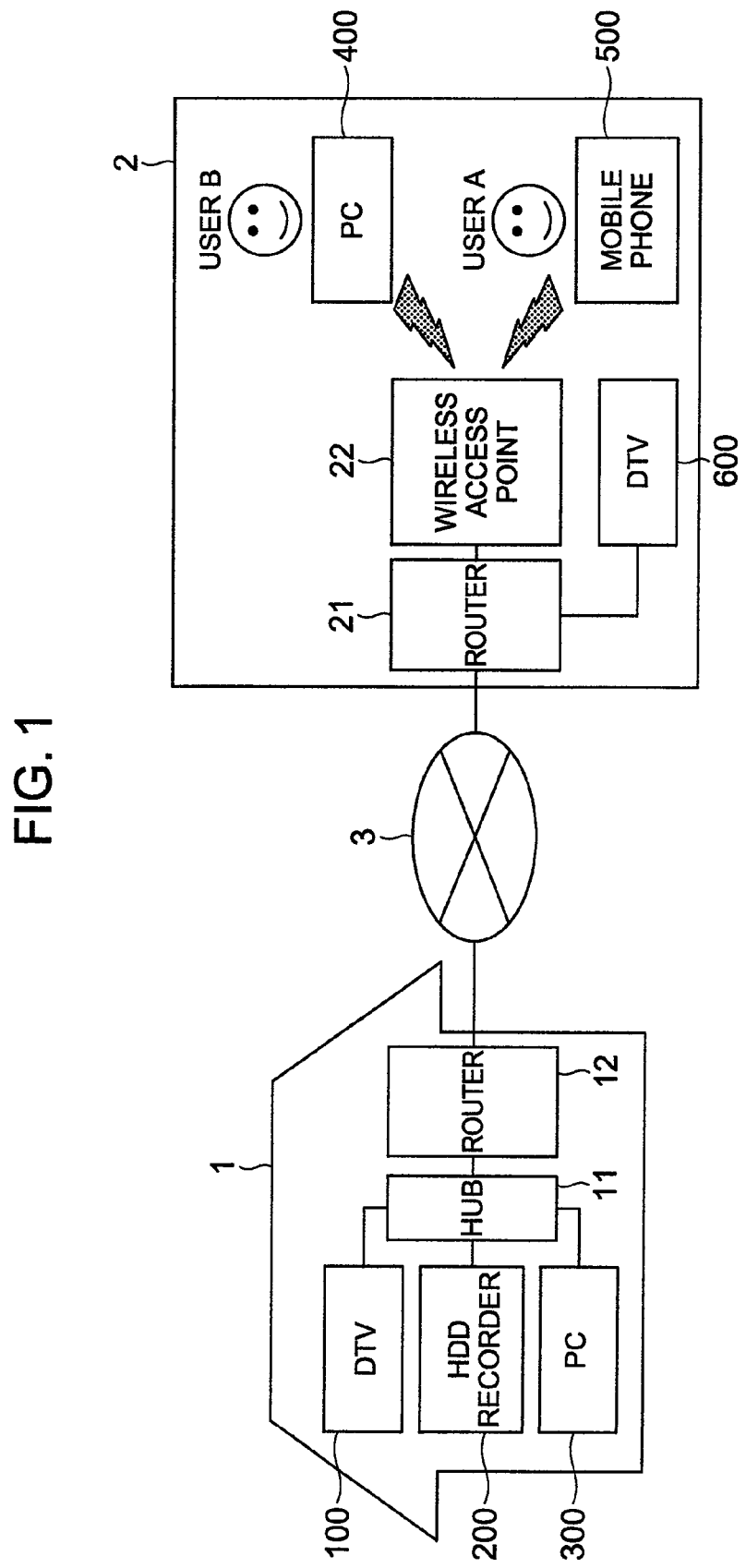
FIG. 1 shows an example of a system configuration.

FIG. 1 shows a system configuration based on the assumption that the user A accesses an in-home equipment from a remote place.

In the home 1 of the user A, a DTV 100, a HDD recorder 200 and a PC 300 owned by the user A are connected to a network 3 by the wired LAN through a hub 11. Also, the hub 11 is connectable to an internet 3 through a router 12.

In the remote place (for example, a hotel or a company) where the user A is located, a mobile phone 500 of the user A can communicate with a wireless access point 22, and can be connected to the internet 3 through a router 21. Also, the PC 400 of the user B can be connected to the internet 3 in a similar way. Further, a DTV 600 installed at a remote place is connectable to the internet 3 through the router 21.

In the LAN, the standard IP (Internet Protocol) is used as a network protocol, and TCP (Transmission Control Protocol) and UDP (User Datagram Protocol) are used as a high-layer transport protocol. For content transfer, on the other hand, a higher-layer application protocol such as RTP (Real-time Transport Protocol), HTTP (Hyper Text Transfer Protocol), FTP (File Transfer Protocol), etc. is used. Incidentally, IPv4 and IPv6 are available as different IP versions to any of which the invention is not limited.

The DTV 100, the HDD recorder 200, the PCs 300, 400, the mobile phone 500 and the routers 12, 21 connected to the network each have an IP address for identifying themselves on LAN. Also, a 48-bit MAC (Media Access Control) address is assigned to the interface unit of each network communication processing circuit in advance at the time of manufacture. The IP address is set for each equipment by DHCP (Dynamic Host Configuration Protocol) widely used in the prior art for automatic address setting in the network in which the routers 12, 21, for example, are operated as a DHCP server thereby to distribute the IP address to each equipment.

Incidentally, in the case where IPv6 is used, each equipment can determine the IP address thereof from the high-order 64 bits of the IP address of the routers 12, 21 and the MAC address thereof by what is called a stateless automatic setting method.

Although the equipments in the home 1 of the user are interconnected by wired LAN in FIG. 1, the LAN, IEEE1394, USB or Bluetooth through the wireless access point may alternatively be used. Also, the hub 11 and the router 12 may be integrated with each other, and so may the wireless access point 22 and the router 21.

Also, the routers 12, 21 are connected to the internet through a modem or a photoelectric converter, not shown, or by a modem or a photoelectric converter built in the router. The routers 12, 21 may be connected to the internet in any types of methods including a high-speed access line such as ADSL (Asymmetric Digital Subscriber Line) or optical fiber, ISDN (Integrated Services Digital Network), an analog telephone line or a mobile communication network for mobile phones. The network at the remote place 2 is also configured similarly.

Further, each equipment in the user home 1 can be accessed through the internet 3 from the remote place 2 using a technique such as the port forward function of the router or VPN (Virtual Private Network).

Figure 2:
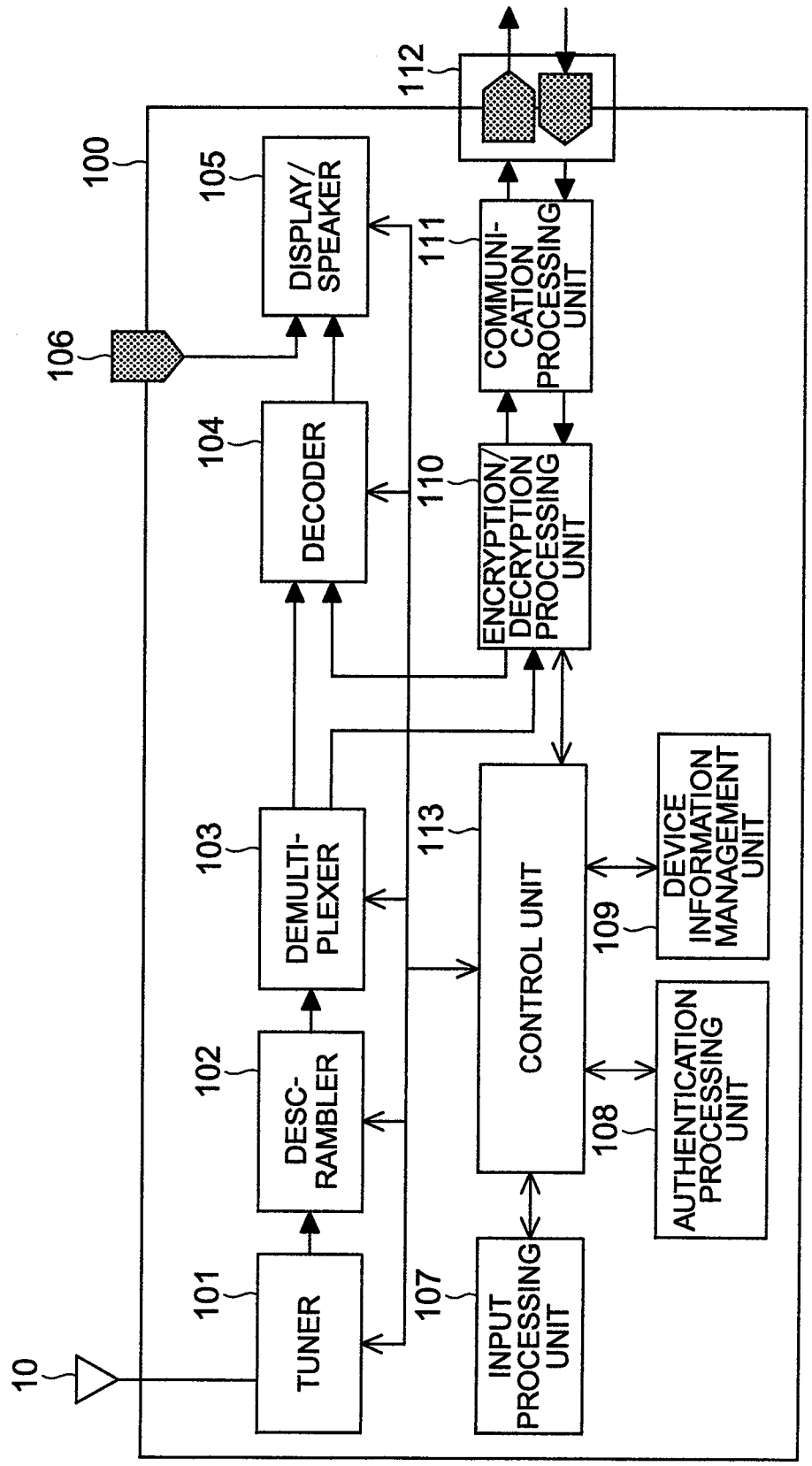
FIG. 2 shows an example of a block configuration of a DTV.

Next, an example of the configuration of the DTV 100 is explained with reference to FIG. 2. Incidentally, the DTV 600 is similarly configured.

The DTV 100 is configured of a tuner 101, a descrambler 102, a demultiplexer 103, a decoder 104, a display/speaker 105, a digital terminal 106, an input processing unit 107, an authentication processing unit 108, a device information management unit 109, an encryption/decryption processing unit 110, a communication processing unit 111, a digital input/output terminal 112 and a control unit 113.

The tuner 101 is a part to select the desired one of a plurality of channels received from a broadcast station through an antenna 10 and demodulate the program digitally modulated.

The descrambler 102 is a part to descramble the program scrambled to make it possible to receive only the channel under contract with a service provider.

The demultiplexer 103 is a part to extract the audio and video data from a broadcast program.

The decoder 104 is a part to decode the compressed audio and video data in a broadcast program or received from the digital input/output terminal 112 and decompress the data into the original audio and video signals.

The display/speaker 105 is a part to reproduce the output signal from the decoder 104 or the signal input from the digital terminal 106. The display/speaker 105 may not be built in but may be remotely attached.

The digital terminal 106 is a part to input the digital data not compressed, and constituted of, for example, a HDMI (High-Definition Multimedia Interface).

The input processing unit 107 is a part for the user to operate the DTV 100 using a remote controller or a touch panel.

The equipment authentication processing unit 108 is a part which in order to transfer the copyright-protected content through LAN, mutually authenticates a particular AV equipment and other AV equipments to confirm the legitimacy thereof based on a specified authentication protocol, and shares the key used for content encryption and decryption. The specified authentication protocol is, for example, the DTCP method described above.

The device information management unit 109 is a part to manage the information on the AV equipments successfully authenticated by the equipment authentication processing unit 108.

The encryption/decryption processing unit 110 is a part in which the broadcast program or the contents received through the digital input/output terminal 112 by LAN are encrypted or decrypted using the key shared by the equipment authentication processing unit 108.

The communication processing unit 111 is a part to transmit or receive the contents and the control command to or from other AV equipments connected by LAN through the digital input/output terminal 112. The contents are transmitted together with an identification code such as "copy free", "copy one generation", "copy never" or "no more copies" indicating the manner in which the transmitted contents are to be handled.

The digital input/output terminal 112 is a part to input or output the contents and the control command through LAN.

The control unit 113 is a part for centrally controlling the operation of each part of the DTV 100.

Figure 3:
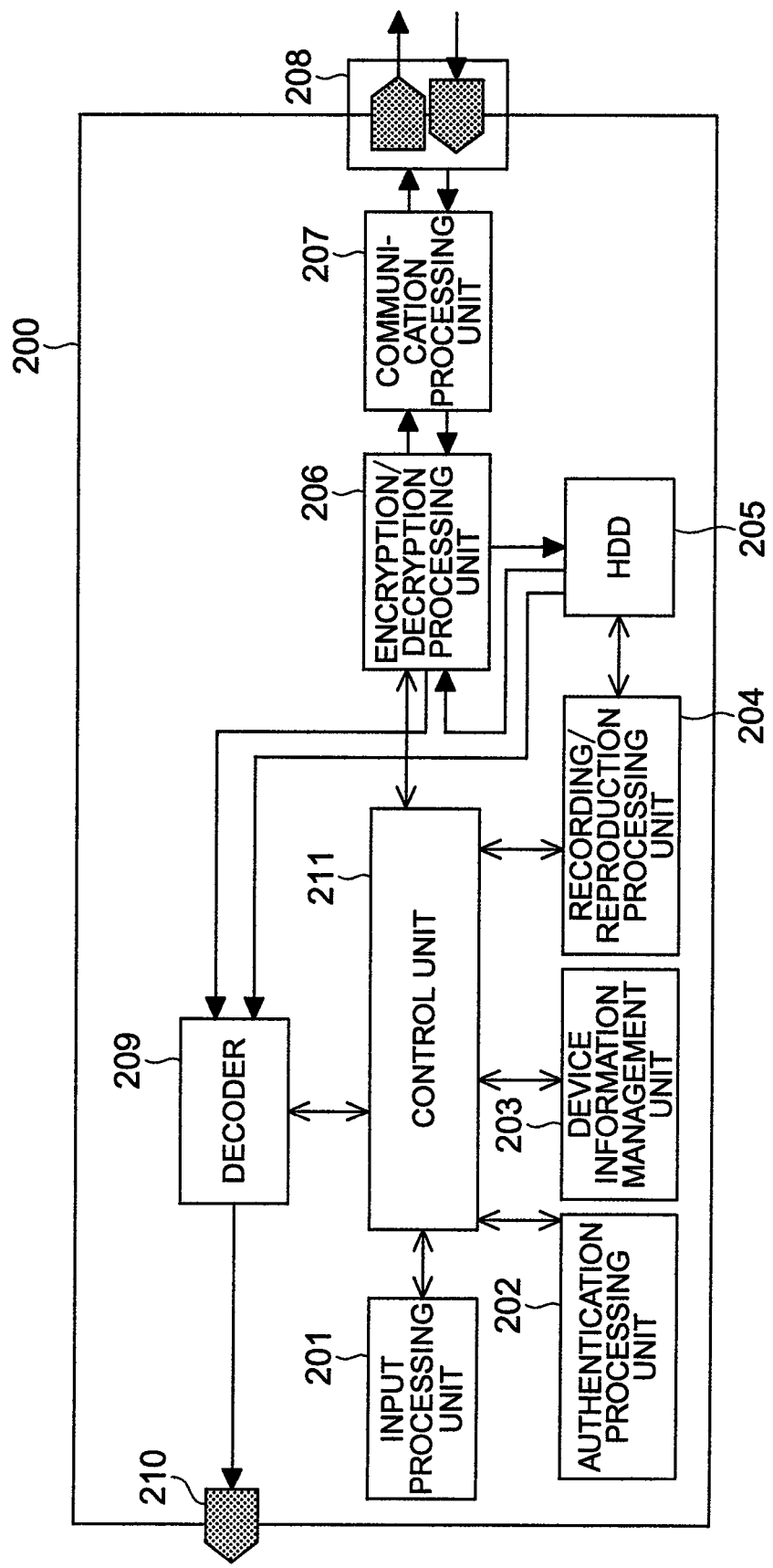
FIG. 3 shows an example of a block configuration of a HDD recorder.

Next, an example of the configuration of the HDD recorder 200 is explained with reference to FIG. 3.

The HDD recorder 200 is configured of an input processing unit 201, an authentication processing unit 202, a device information management unit 203, a recording/reproduction processing unit 204, a HDD 205, an encryption/decryption processing unit 206, a communication processing unit 207, a digital input/output terminal 208, a decoder 209, a digital terminal 210 and a control unit 211.

The recording/reproduction processing unit 204 is a part for the recording control to record the contents in the HDD 205 and the reproduction control to reproduce the contents recorded in the HDD 205.

The HDD 205 is a built-in memory for recording a broadcast program. This may be replaced by other units such as a removable HDD or optical disk, a memory card or a hybrid memory combining any of them.

The digital terminal 210 is a part in which the non-compressed digital data output from the decoder 209 is output to a remote display or speaker.

The other parts are similar to the corresponding parts of the DTV 100.

Figure 4:
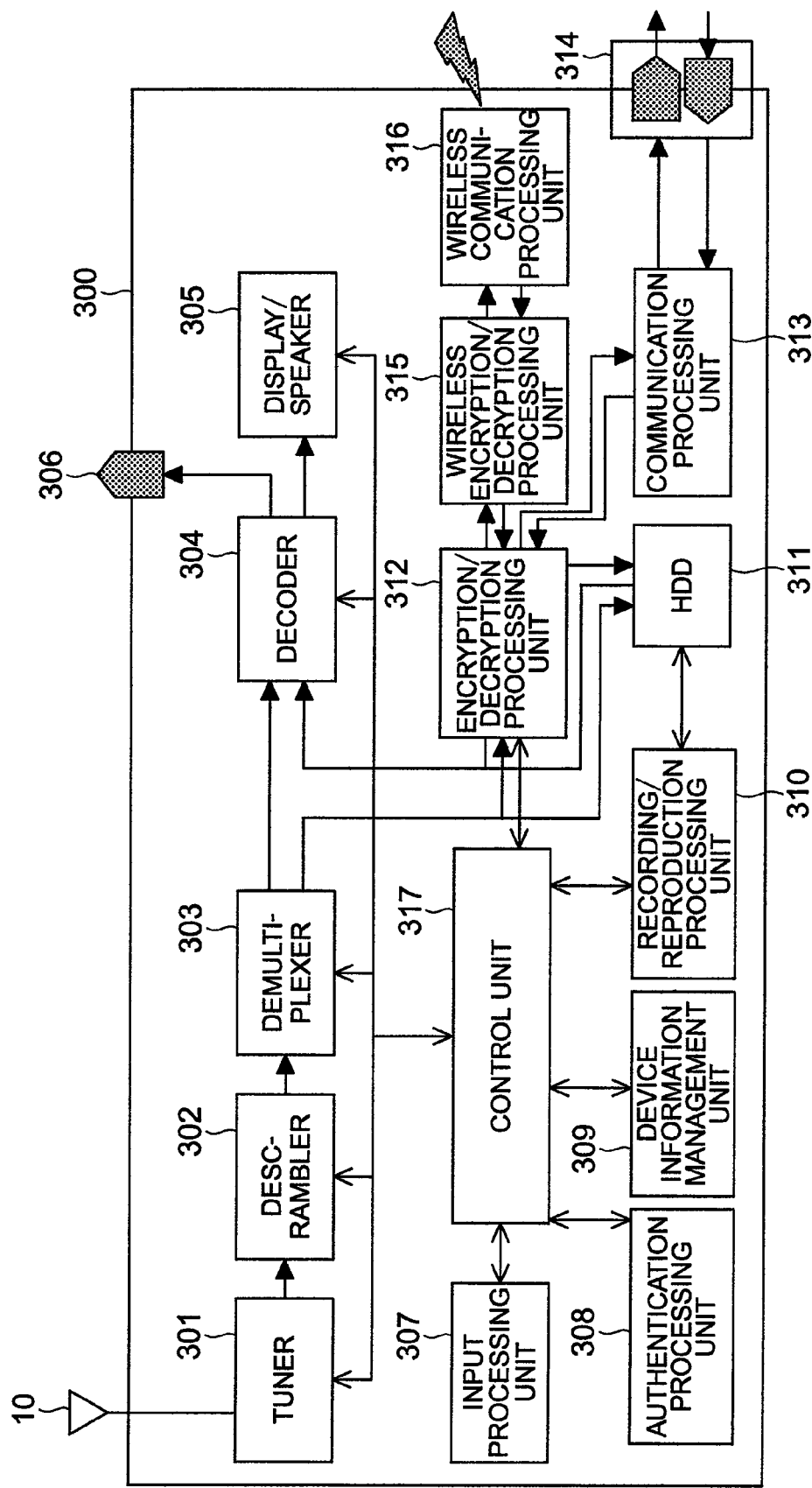
FIG. 4 shows an example of a block configuration of a PC.

Next, an example of the configuration of the PC 300 is explained with reference to FIG. 4.

The PC 300 is configured of a tuner 301, a descrambler 302, a demultiplexer 303, a decoder 304, a display/speaker 305, a digital terminal 306, an input processing unit 307, an authentication processing unit 308, a device information management unit 309, a recording/reproduction processing unit 310, a HDD 311, an encryption/decryption processing unit 312, a communication processing unit 313, a digital input/output terminal 314, a wireless encryption/decryption processing unit 315, a wireless communication processing unit 316 and a control unit 317.

The wireless encryption/decryption processing unit 315 is a part in which the contents received by wireless LAN through the wireless communication processing unit 316 or the contents output from the encryption/decryption processing unit 312 are encrypted/decrypted using a well-known standard encryption method such as WEP (Wired Equivalent Privacy) used as a standard for security protection in wireless LAN. In place of the wireless LAN, the wireless communication system for the mobile phone such as 3G or W-CDMA (Wideband Code Division Multiple Access) may be employed.

The wireless communication processing unit 316 is a part to transmit/receive the contents and the control command to and from a wireless access point 22 or other AV equipments connected by wireless LAN.

The other parts are similar to the corresponding parts, respectively, of the DTV 100 and the HDD recorder 200. Also, the PC 400 may have a similar configuration.

Figure 5:
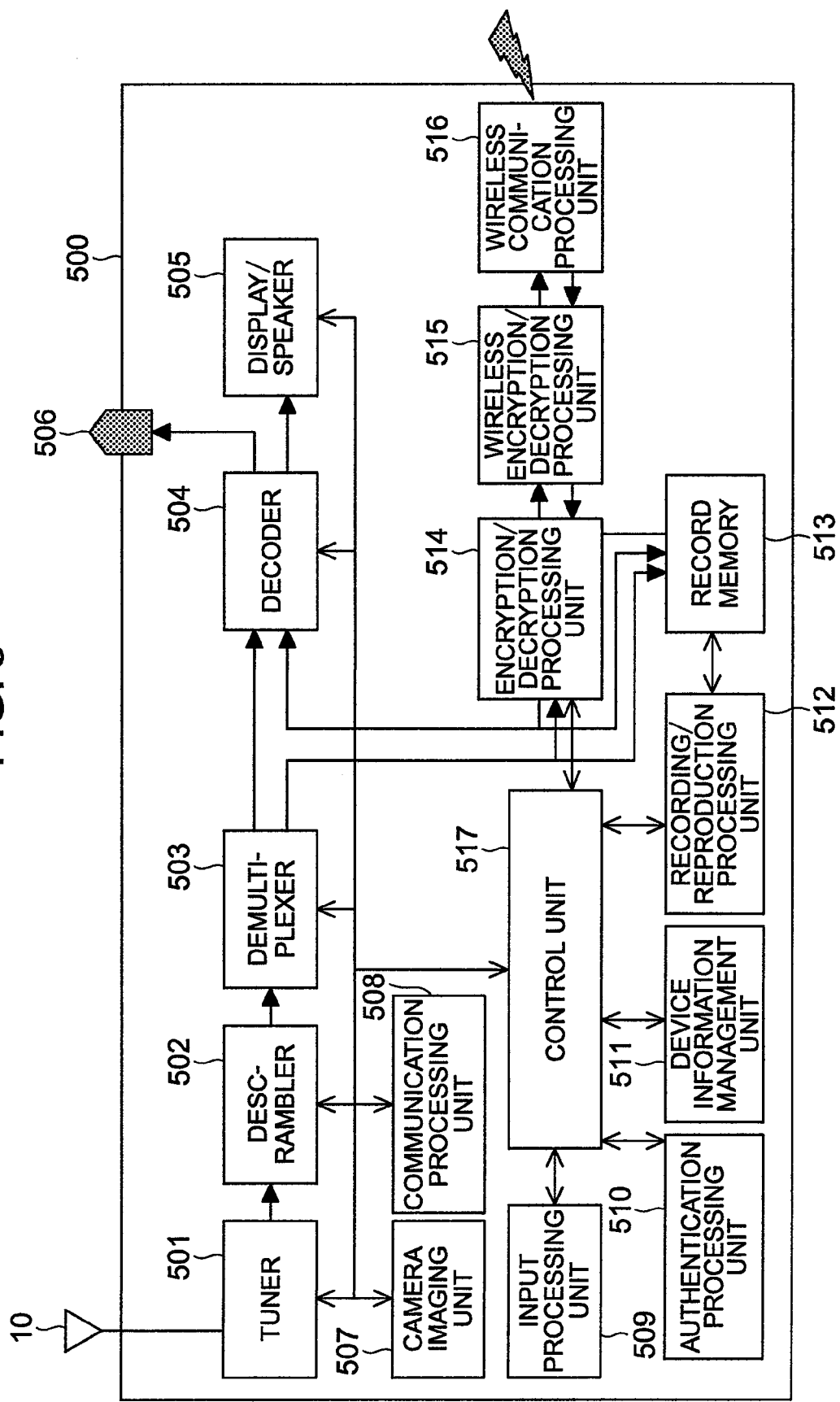
FIG. 5 shows an example of a block configuration of a mobile phone.

Next, an example of the configuration of the mobile phone 500 is explained with reference to FIG. 5.

The mobile phone 500 is configured of a tuner 501, a descrambler 502, a demultiplexer 503, a decoder 504, a display/speaker 505, a digital terminal 506, a camera imaging unit 507, a communication processing unit 508, an input processing unit 509, an authentication processing unit 510, a device information management unit 511, a recording/reproduction processing unit 512, a record memory 513, an encryption/decryption processing unit 514, a wireless encryption/decryption processing unit 515, a wireless communication processing unit 516 and a control unit 517.

The camera imaging unit 507 is a part of a camera to pick up an image.

The record memory 507 is a nonvolatile memory to store the dynamic or still image picked up by the camera imaging unit 507, the program received through the tuner 501 and the information such as the personal information and the address book. The record memory 507 may be either built in or replaceable.

The other parts are similar to the corresponding parts, respectively, of the DTV 100, the HDD recorder 200 and the PC 300.

Figure 6:
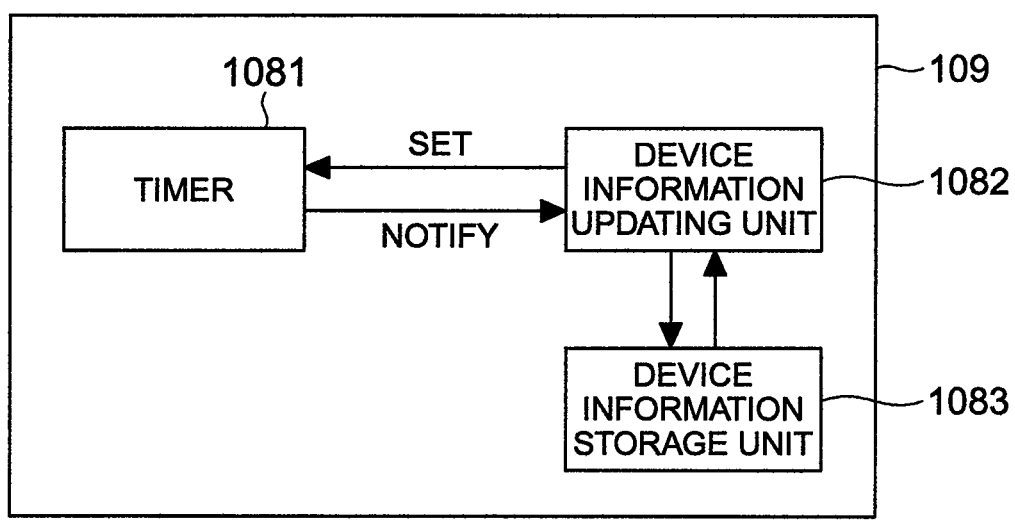
FIG. 6 shows an example of a configuration of a device information management unit.

Next, an example of the configuration of the device information management unit 109 (similar to 203, 309, 511) in each of the equipments described above is explained with reference to FIG. 6.

The device information management unit 109 is configured of a timer 1081, a device information updating unit 1082 and an device information storage unit 1083.

The timer 1081 is a part used to count time in the case where the equipment authentication processing unit 108 (similar to the units 202, 308, 510) confirms whether any equipment to be authenticated exists in home or in the case where the term of validity of the registration information stored in the device information storage unit 1083 described later is managed.

The device information updating unit 1082 is a part to manage the term of validity of the registration information held in the device information storage unit 1083 described later and to register, update or delete the information as required.

The device information storage unit 1083 is a part to hold the information on the equipments to be authenticated, in the case where the equipments are successfully authenticated by the equipment authentication processing unit 108.

Next, an example of the configuration of the equipment information 70 stored in the device information storage unit 1083 is explained with reference to FIG. 7.

The equipment information 70 is configured of a management table 700 and an equipment information table 710.

The management table 700 is configured of a maximum authentication number 701, a maximum counter value 702 and a maximum remote access number 703.

The maximum authentication number 701 is the maximum number of times the equipment can be authenticated between the content transmission equipment and the content reception equipment using the equipment authentication processing unit 108.

The maximum counter value 702 is the maximum value on the counter which is set in the timer 1081.

The maximum remote access number 703 is the maximum number of times a remote content access request is permitted.

The device information table 710, on the other hand, is configured of an ID 711, a device ID 712, address information 713, a counter value 714, a remote access key 715, a remote access key label 715A and an access situation 716.

The ID 711 indicates the registration number of the table.

The device ID 712 is an identifier for identifying each equipment uniquely. The device ID 712 is the information unique to each equipment such as a unique ID used for IEEE1394, a device ID used for DTCP which is generated by a specified certificate authority and held in a nonvolatile memory in advance at the time of manufacture of each equipment. The device ID 712 has a value unique to each equipment and may contain other information such as a public key.

The address information 713 indicates an IP address or a MAC address of each equipment on the network.

The counter value 714 is the present value on the counter which is set in the timer 1081.

The remote access key 715 is the key information used in the authentication and encryption/decryption process at the time of content transfer between the in-home content transmission equipment and the remote content reception equipment.

The remote access key label 716 is an identifier used to identify the remote access key 715.

The access situation 716 indicates the transfer situation (for example, "off", "in home" or "remote") between the content transmission equipment and the content reception equipment.

Figure 8:
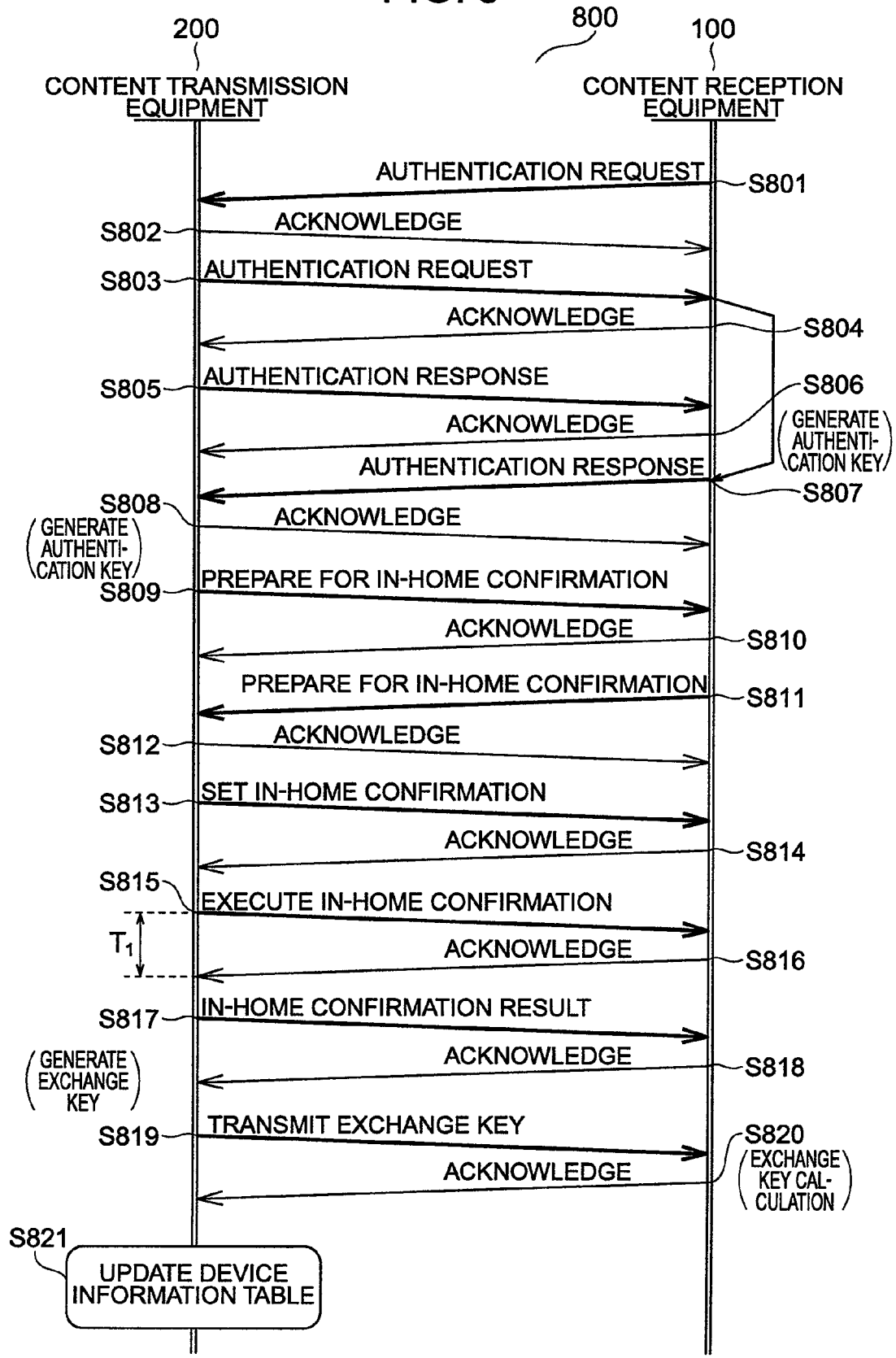
FIG. 8 shows an example of the equipment authentication sequence normally executed between an in-home content transmission equipment and a content reception equipment.

An equipment authentication processing procedure 800 executed between the HDD recorder (content transmission equipment) 200 and the DTV (content reception equipment) 100 in the system configuration of FIG. 1 using each equipment and each information described above is explained with reference to FIG. 8. The protocol TCP is used for transmission and reception of the information for the equipment authentication process. Upon transmission of various information such as an authentication request to an equipment at the other end or an authentication response to the request, the acknowledgment of reception of the request is returned from the unit at the other end, so that a communication path which can detect a transmission error is secured. Incidentally, the data transmission/reception for establishment or abandonment of TCP connection is not shown in FIG. 8.

First, an authentication request is generated by the content reception equipment 100. The equipment authentication processing unit 108 of the content reception equipment 100 sends the authentication request, through the communication processing unit 111 to the content transmission equipment 200, together with the information unique to the equipment including the aforementioned device ID and a certificate of the information (S801).

The equipment authentication processing unit 202 of the content transmission equipment 200 receives the authentication request through the communication processing unit 207 and sends the acknowledgment to the content reception equipment 100 (S802). Then, the equipment authentication processing unit 202 of the content transmission equipment 200 generates an authentication request by itself, and like in the case of the content reception equipment 100, sends the authentication request to the content reception equipment 100 together with the information unique to the content transmission equipment 200 and a certificate thereof (S803).

The equipment authentication processing unit 108 of the content reception equipment 100 receives the authentication request and sends the acknowledgment to the content transmission equipment 100 (S804).

Next, the equipment authentication processing unit 202 of the content transmission equipment 200 verifies each information received in the authentication request, and sends an authentication response to the content reception equipment 100 together with the parameter required for generation of the key information (S805).

The equipment authentication processing unit 108 of the content reception equipment 100, after receiving the authentication response and sending the acknowledgment to the content reception equipment 200 (S806), generates an authentication response by itself and like in the case of the content transmission equipment 200, sends it to the content transmission equipment 200 together with the parameter required for generation of the key information (S807) thereby to generate an authentication key shared with the content transmission equipment 200 using the required parameter.

The equipment authentication processing unit 202 of the content transmission equipment 200, after receiving the authentication response and sending the acknowledgment to the content reception equipment 100 (S808), like the content transmission equipment 100, generates the authentication key shared with the content reception equipment 100 using the required parameter.

Through the steps described above, the equipment authentication processing unit 108 of the content transmission equipment 200 and the equipment authentication processing unit 202 of the content reception equipment 100 generate and share a common authentication key.

In order to confirm whether the content reception equipment 100 is existing in home or not, the content transmission equipment 200 notifies the content reception equipment 100 that the preparation is made for in-home confirmation.

The equipment authentication processing unit 108 of the content reception equipment 100, after receiving the notification for in-home confirmation preparation and sending the acknowledgment to the content transmission equipment 200 (S810), generates an in-home confirmation preparation notice by itself and sends it to the content transmission equipment 200 (S811).

The equipment authentication processing unit 202 of the content transmission equipment 200, after receiving the in-home confirmation preparation notice and sending the acknowledgment to the content reception equipment 100 (S812), sends an in-home confirmation setting request to the content reception equipment 100 together with the information required for the in-home confirmation (S813).

The equipment authentication processing unit 108 of the content reception equipment 100, after receiving the in-home confirmation setting request and making the preparation required for the in-home confirmation, sends the acknowledgment to the content transmission equipment 200 (S814).

The equipment authentication processing unit 202 of the content transmission equipment 200 that has received the acknowledgment, after starting the timer 1081 in the device information management unit 203, sends an in-home confirmation execution request to the content reception equipment 100 to confirm whether the content reception equipment 100 exists in home or not (S815).

The equipment authentication processing unit 108 of the content reception equipment 100 receives the in-home confirmation execution request and sends the acknowledgment to the content transmission equipment 200 (S816).

The equipment authentication processing unit 202 of the content transmission equipment 200, upon reception of the acknowledgment, stops the timer 1081 and confirms that the measurement time (T1) before reception of the acknowledgment from the issue of the in-home confirmation execution request is not longer than a predetermined value (T). In the case where the measurement value (T1) is not longer than the predetermined value (T), the equipment authentication processing unit 202 judges that the content reception equipment 100 exists in home and is expected to be used within the range of personal use and sends the corresponding in-home confirmation result to the content reception equipment 100 (S817). In the case where the measurement value (T1) is longer than the predetermined value (T), on the other hand, the equipment authentication processing unit 202 judges that the content reception equipment 100 may exist at a remote place, and by suspending the process, terminates the equipment authentication process.

The equipment authentication processing unit 108 of the content reception equipment 100 that has received the in-home configuration result sends the acknowledgment to the content transmission equipment 200 (S818). Then, the equipment authentication processing unit 202 of the content transmission equipment 200 generates an exchange key used for content encryption, and by encrypting the exchange key using the authentication key, sends it to the content reception equipment 100 together with the ID for identifying the exchange key.

The equipment authentication processing unit 108 of the content reception equipment 100 decrypts the exchange key sent from the content transmission equipment 200 using the authentication key, and sends the acknowledgment (S820).

The equipment authentication processing unit 202 of the content transmission equipment 200, upon reception of the acknowledgment, registers the information on the content reception equipment 100 in the device information table 710 in the device information management unit 203 (S821). As indicated by the record 721 of the ID 711 in the device information table 710, for example, the device ID of the content reception equipment 100 that has been received in step S801 is set in the device ID 712, the MAC address of the content reception equipment 100 on the network in the address information 713, the maximum counter value 702 of the management table 700 in the counter value 714, and "off" in the access situation 716.

In this way, the equipment authentication processing unit 202 of the content transmission equipment 200 and the equipment authentication processing unit 108 of the content reception equipment 100 share a common exchange key. This exchange key is used for generating a common key to encrypt/decrypt the contents. For generation of the authentication key, the exchange key and the common key described above, the well-known key generation/key exchange algorithm can be used. Also, the processes of steps S809 and S813 may be combined, and so the processes of steps S817 and S819.

The foregoing explanation concerns the equipment authentication process executed between the content transmission equipment and the content reception equipment in the content transfer in home.

Figure 9:
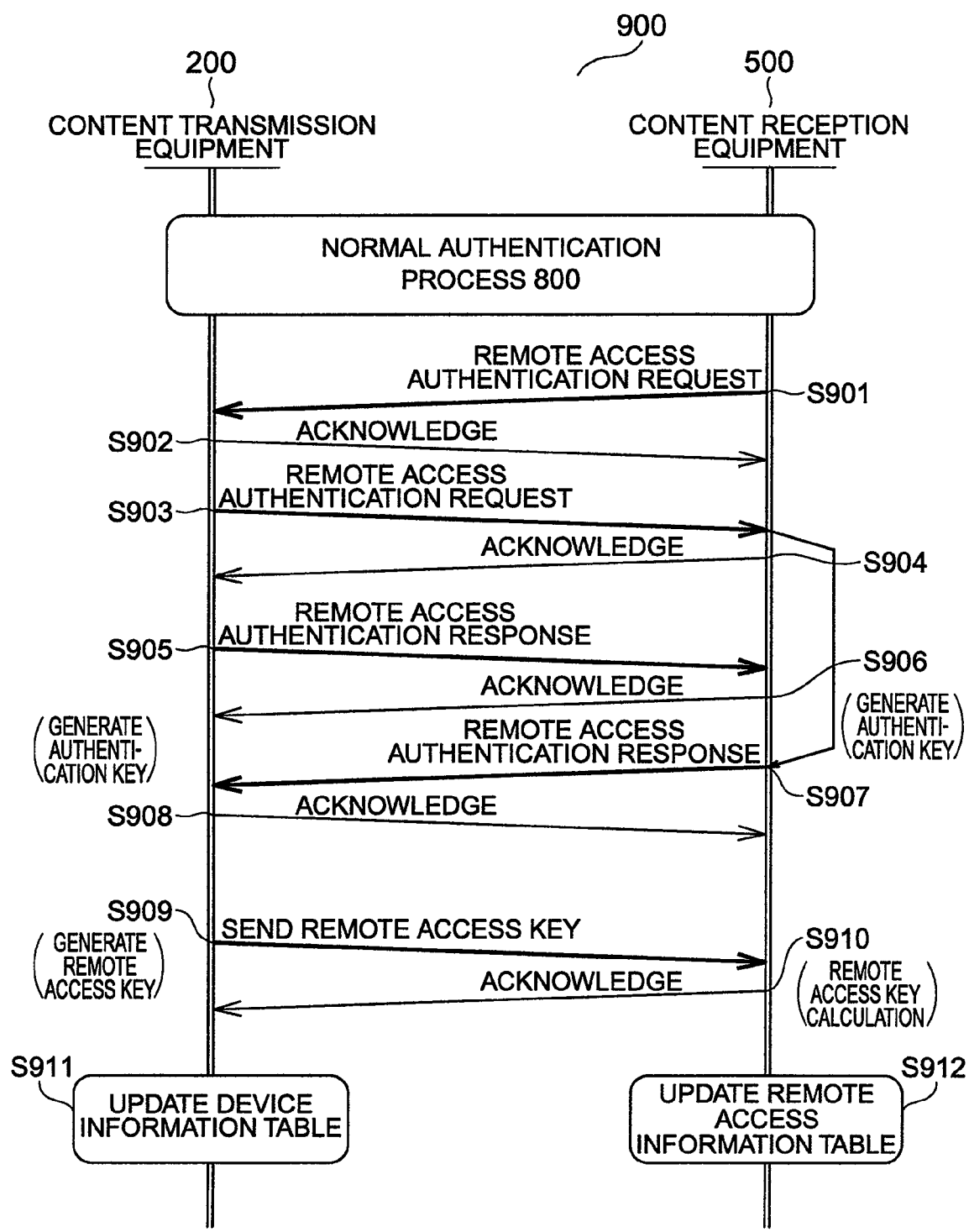
FIG. 9 shows an example of the equipment authentication sequence for executing the key exchange for remote access between an in-home content transmission equipment and a content reception equipment.

Next, the equipment authentication processing steps for remote access which are executed between the HDD recorder (content transmission equipment) 200 and the mobile phone (content reception equipment) 500 in the system configuration shown in FIG. 1 are explained with reference to FIG. 9.

First, the content transmission equipment 200 and the content reception equipment 500 execute the equipment authentication process 800 explained above with reference to FIG. 8.

After that, the equipment authentication processing unit 510 of the content reception equipment 500 generates a remote access authentication request and sends it to the content transmission equipment 200 (S901). This remote access authentication request may contain the random number created using a predetermined arithmetic algorithm or the information unique to the equipment.

The equipment authentication processing unit 202 of the content transmission equipment 200 receives the remote access authentication request and sends the acknowledgment to the content reception equipment 500 (S902). Then, as in the case of the content reception equipment 500, the equipment authentication processing unit 202 generates a remote access authentication request by itself, and sends it to the content reception equipment 500 (S903)

The equipment authentication processing unit 510 of the content reception equipment 500 receives the remote access authentication request and sends the acknowledgment to the content transmission equipment 200 (S904).

Next, the equipment authentication processing unit 202 of the content transmission equipment 200 verifies each information received in the remote access authentication request and sends a remote access authentication response to the content reception equipment 500 together with the parameters required for generation of the key information (S905).

The equipment authentication processing unit 510 of the content reception equipment 500, after receiving the remote access authentication response and sending the acknowledgment to the content transmission equipment 200 (S906), generates a remote access authentication response by itself, and like in the case of the content transmission equipment, sends the remote access authentication response to the content transmission equipment 200 together with the parameters required for generation of the key information (S907), thereby generating an authentication key shared with the content transmission equipment 200 using the required parameters.

The equipment authentication processing unit 202 of the content transmission equipment 200, which receives the remote access authentication response and sends the acknowledgment to the content reception equipment 500, generates, like in the content reception equipment 500, the authentication key shared with the content reception equipment 500 using the required parameters (S908). The equipment authentication processing unit 202 of the content transmission equipment 200 generates the remote access key dedicated to the content reception equipment 500 for use in the content encryption and the equipment authentication process at the time of using the remote contents, and by encrypting the remote access key using the authentication key generated in step S908, sends it to the content reception equipment 500 (S909).

The equipment authentication processing unit 510 of the content reception equipment 500, upon reception of the remote access key, sends the acknowledgment to the content transmission equipment 200 (S910) and decrypts the remote access key using the authentication key.

The equipment authentication processing unit 202 of the content transmission equipment 200, upon reception of the acknowledgment, adds the information on the content reception equipment 500 to equipment information table 710 in the device information management unit 203 (S911). As indicated by the record 722 of the ID 711 in the device information table 710, for example, the ID 711, the device ID 712, the address information 713, the counter value 714 and the access situation 716 are set as described above. Further, the remote access key sent to the content reception equipment 500 is additionally set in the remote access key 715.

The equipment authentication processing unit 510 of the content reception equipment 500, on the other hand, generates or updates the remote access information table 1000 stored in the device information management unit 511 (S912).

Now, an example of the configuration of the remote access information table 1000 is explained with reference to FIG. 10.

The remote access information table 1000 held in the device information management unit 511 is configured of address information 1001, registration information 1002 and a remote access common key 1003.

The address information such as the MAC address, the IP address or the port number required for the content reception equipment 500 to access the content transmission equipment 200 or the router 12 from a remote place are registered as the address information 1001.

The user name or the password required for the content reception equipment 500 to log in to the content transmission equipment 200 or the router 12 from a remote place are registered as the registration information 1002.

The remote access key received in step S910 is set as the remote access common key 1003.

As described above, in order to use the contents stored in the content transmission equipment 200 from a remote place in response to the request from the content reception equipment 500 after execution of the normal authentication, the content transmission equipment 200 and the content reception equipment 500 come to share a common key for remote access. The remote access key generated by the content transmission equipment 200 is a common key used only for the content reception equipment 500 and cannot be used for other content reception equipments. Also, the remote access key is used for the equipment authentication process executed at the time of receiving a content distribution request from a remote place and/or the generation of a common key for content encryption. A well-known key generation/key exchange algorithm can be used for generation of the authentication key, the exchange key or the remote access key.

A method is also available in which by omitting the process of steps S903 to S908, the remote access key is encrypted using the authentication key shared by the normal authentication process 800 and sent to the content reception equipment 500 in step 909. As another alternative, the content transmission equipment 200 is allowed to have the time of accepting the remote access authentication request after the normal authentication process 800 so that the content reception equipment 500 is required to issue the remote access authentication request within a predetermined time. As still another alternative, the process of steps S901 and S902 may be executed immediately before step S819 in the normal authentication process 800, in which case steps S909 and S910 may be executed after step S820 or steps S819 and S909 may be combined into a single step.

Next, with reference to FIG. 11, an explanation is given about the procedure in which the user A takes out the mobile phone 500 from his/her home and by using the mobile phone (content reception equipment) 500 at a remote place B, views the content recorded in the HDD 205 of the HDD recorder (content transmission equipment) 200.

Figure 15:
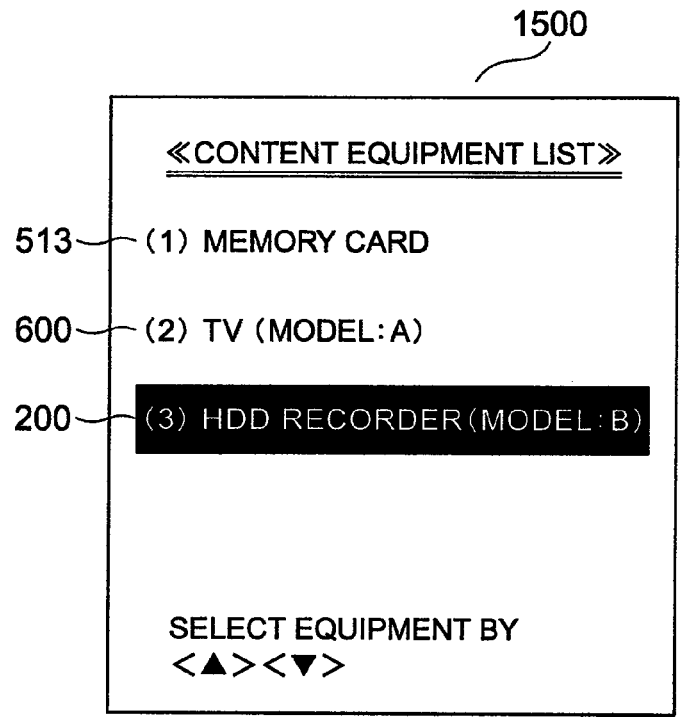
FIG. 15 shows an example of a content transmission equipment list screen of a mobile phone.

First, the user A issues a content viewing command using the input processing unit 509 of the mobile phone 500. Then, the control unit 517 of the mobile phone 500 displays a content transmission equipment list screen (FIG. 15) on the display/speaker 505. A record memory 513, the content transmission equipment (DTV 600) detected to be currently existent on the network and the content transmission equipment 200 registered in the remote access information table 1000 managed by the device information management unit 511 are displayed on the content transmission equipment list screen 1500 (S1101).

In a method available to detect the content transmission equipment existing on the network, for example, a UDP packet containing "a request to detect an equipment having the content transmission function" is multicast to all the equipments on the network and only an equipment having such a function responds thereby to recognize the content transmission equipment. This method can use the conventional technique such as SSDP (Simple Service Discovery Protocol) or DLNA (Digital Living Network Alliance).

Next, the user A selects the content transmission equipment 200 on the content transmission equipment list screen 1500. Then, the control unit 517 of the content reception equipment 500, by accessing the address information of the content reception equipment 500 registered in the remote access information table 1000, sends a content information acquisition request to the content transmission equipment 200 in the home 1 of the user A through the internet 3 including a wireless access point 22 and a router 21 from a wireless communication processing unit 516 (S1102).

The control unit 211 of the content transmission equipment 200 sends the acknowledgment to the content reception equipment 500 through the communication control unit 207 (S1103), so that the information on a part or the whole of the contents (for example, the title, date, copy control information and the recording time) stored in the HDD 205 are sent to the content reception equipment 500 (S1104).

Figure 16:
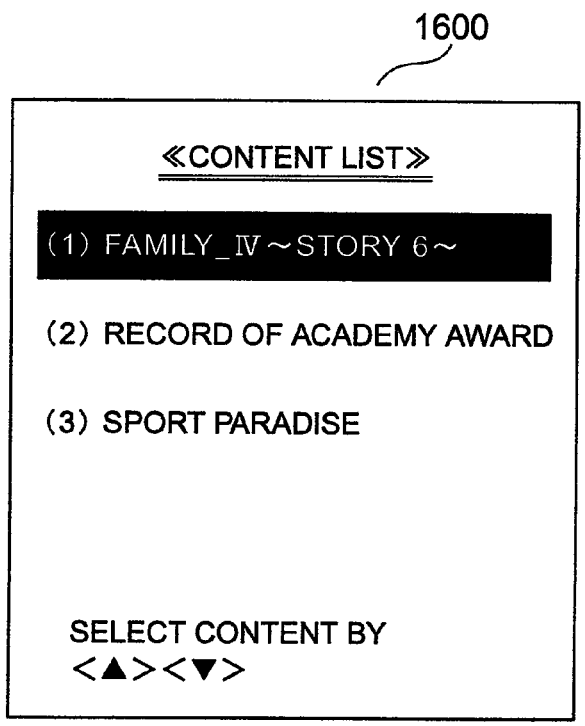
FIG. 16 shows an example of a content list screen of a mobile phone.

The control unit 517 of the content reception equipment 500 sends the acknowledgment to the content transmission equipment 200 (S1105), and the content information thus received are displayed on the display/speaker 505 as a content list screen (FIG. 16). The content desired to view on the content list screen 1600 is designated by the user A through the input processing unit 509 (S1106). Then, the equipment authentication processing unit 510 of the content reception equipment 500 generates a remote authentication request. The remote authentication request is sent to the content transmission equipment 200 together with the information unique to the equipment including the device ID, the remote access key or the calculation value generated using the key and a certificate (S1107).

The equipment authentication processing unit 202 of the content transmission equipment 200 which has received the remote authentication request confirms that the device ID of the content reception equipment 500 is registered in the device information table 710 managed in the device information management unit 203, and sends the acknowledgment to the content reception equipment 500 (S1108). In the case where the device ID of the content reception equipment 500 is not registered in the device information table 710, the content transmission equipment 100 suspends the process.

Next, the equipment authentication processing unit 202 of the content transmission equipment 200 generates a remote authentication request by itself, and as in the case of the content reception equipment, sends it to the content reception equipment 500 together with the information unique to the content transmission equipment 200, the remote access key or the calculation value generated using the particular key and a certificate (S1109).

The equipment authentication processing unit 510 of the content reception equipment 500 receives the remote authentication request and sends the acknowledgment to the content transmission equipment 200 (S1110).

Next, the equipment authentication processing unit 202 of the content transmission equipment 200 verifies each information received in the remote authentication request, and sends a remote authentication response to the content reception equipment 500 together with remote access key or the calculation value generated using the key and the parameter required for generation of the key information (S1111).

The equipment authentication processing unit 510 of the content reception equipment 500, after receiving the remote authentication response and sending the acknowledgment to the content transmission equipment 200 (S1112), generates a remote authentication response by itself and, as in the case of the content transmission equipment 200, sends the remote authentication response to the content transmission equipment 200 together with the parameter required for generation of the key information (S1113) thereby to generate the remote authentication key shared with the content transmission equipment 200 using the required parameter.

The equipment authentication processing unit 202 of the content transmission equipment 200, after receiving the remote authentication response and sending the acknowledgment to the content reception equipment 500, generates, as in the case of the content reception equipment 500, an authentication key shared with the content reception equipment 5200 using the required parameter (S1114). After confirming that the counter value 714 of the content reception equipment 500 in the device information table 710 has not reached zero (S1115), the equipment authentication processing unit 202 generates the remote exchange key used for content encryption. The remote exchange key is encrypted using the remote authentication key, and together with the ID for identifying the remote exchange key, sent to the content reception equipment 500 (S1116).

In the equipment authentication processing unit 510 of the content reception equipment 500, the remote exchange key transmitted from the content transmission equipment 200 is decrypted using the remote authentication key, and the acknowledgment sent (S1117).

The equipment authentication processing unit 202 of the content transmission equipment 200, upon reception of the acknowledgment, updates the information on the content reception equipment 500 in the device information table 710 in the device information management unit 203 (S1118). Specifically, the access situation 716 is updated from "off" to "remote".

After that, the control unit 517 of the content reception equipment 500 sends the request to view the desired content to the content transmission equipment 200 (S1119). In the process, the viewing request may be accompanied by the ID for identifying the remote exchange key received in step S1116.

The control unit 211 of the content transmission equipment 200 sends the acknowledgment for reception of the content viewing request (S1120), the equipment authentication processing unit 202 checks to see whether the ID of the remote exchange key is correct or not, and the device information updating unit 1082 starts by setting the timer 1081 in the device information management unit 203 to receive the notice periodically (for example, at intervals of one or ten minutes). Also, the equipment authentication processing unit 202 generates a common key for content encryption using the remote exchange key and sets the common key in the encryption/decryption processing unit 206.

The desired content read from the HDD 205 is encrypted by the encryption/decryption processing unit 206 while at the same time being sent to the content reception equipment 500 (S1121). Each time the notice is received from the timer 1081 during the content transmission, the device information updating unit 1082 updates the counter value 714 (decrements the counter value, for example) in the device information table 710.

The equipment authentication processing unit 510 of the content reception equipment 500 generates a common key for decrypting the content using the remote exchange key and sets the common key in the encryption/decryption processing unit 514. The content received through the wireless communication processing unit 516 and the wireless encryption/decryption processing unit 515 is decrypted by the encryption/decryption processing unit 514 and while being decoded by the decoder 504, output to the display/speaker 505.

As described above, the equipment authentication process 900 for remote access is executed in home beforehand between the content transmission equipment and the content reception equipment. Only in the case where the content reception equipment successfully authenticated is brought out of home and the remote authentication process of steps S1107 to S1117 is successfully executed, then the content can be transferred from the in-home content transmission equipment to the remote content reception equipment.

After the content transfer, the content transmission equipment may stop the timer 1081 and discard the remote exchange key so that the content may not be transmitted as long as the remote authentication process is not executed again even if another content viewing request continues to be issued by the content reception equipment.

Also, the number of the content reception equipments accessible simultaneously from a remote place can be limited by the content transmission equipment using the maximum remote access number 703 in the management table 700.

Although the content transmission equipment 200 receives the "viewing request" in step S1119 as described above, other requests such as a "copy request" or a "move request", if received, may be rejected to avoid the illegal use of the contents as far as possible.

The protocol used to transmit the contents from the content transmission equipment 200 to the content reception unit 500 is not limited to a specified one, but may be any of RTP, HTTP, FTP, etc. The contents can be transmitted by containing, in the payload of each transfer protocol, the content encrypted by a predetermined algorithm using a common key. The well-known encryption technique AES (Advanced Encryption Standard), for example, can be used as the encryption algorithm.

Also, the counter value 714 in the device information table 710 to be updated periodically by the content transmission equipment, though usable as the same value for the in-home and remote content transmission, may alternatively be used as different counter values in home and remotely as shown in FIG. 12. In such a case, a different maximum value can be set as each counter value (i.e. the maximum in-home counter value 702 and the maximum remote counter value 704 in the management table 700).

As understood from the foregoing description, in the content reception equipment accessing an in-home equipment from a remote place, the normal authentication process and the authentication process for remote access are executed in home beforehand with the content transmission equipment thereby to share the remote access key, while at the same time registering the information on the content reception equipment in the device information table of the content transmission equipment. As a result, the content reception equipment can be regarded as a personal property after all, and even if brought out of home, the content thereof can be viewed safely without departing from the range of personal content use.

Embodiment 2

The feature of this embodiment lies in preventing the illegal viewing and copy while at the same time making it possible to view the in-home contents on an unspecified content reception equipment at a remote place without departing from the range of personal content use.

Figure 13:
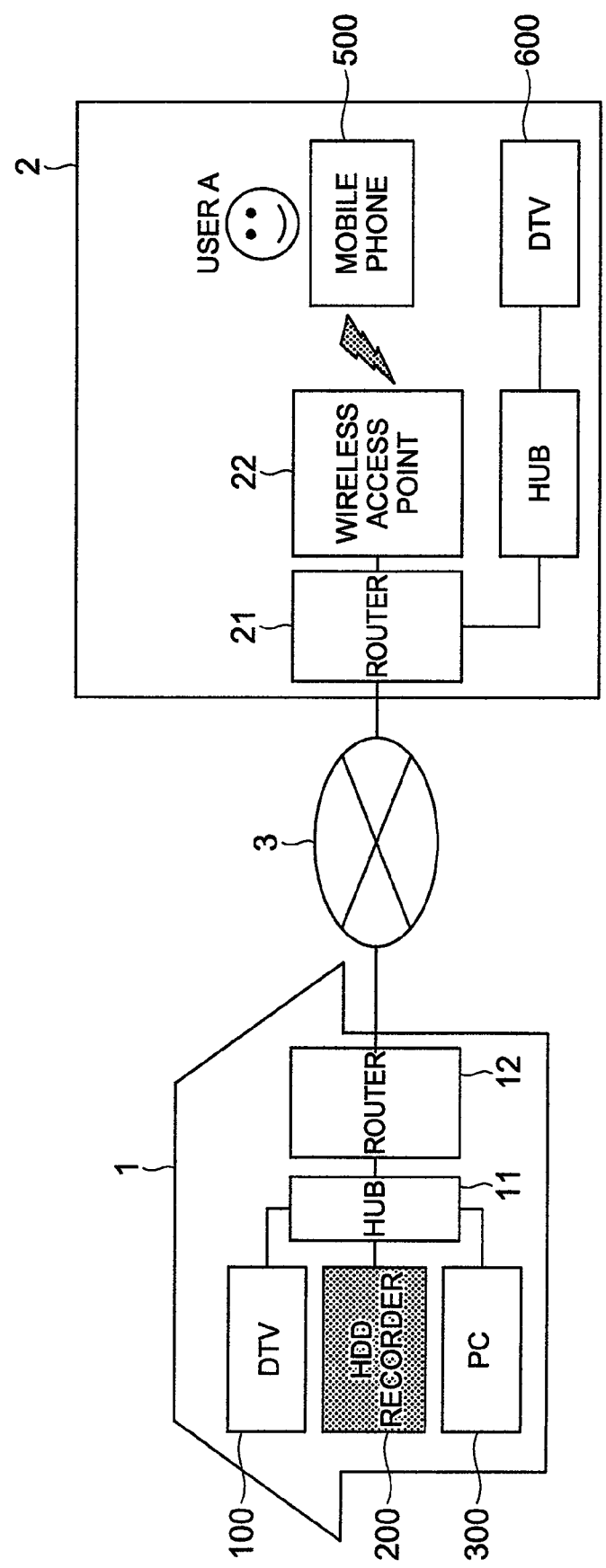
FIG. 13 shows an example of the system configuration.

FIG. 13 shows an example of the system configuration in an assumed case where the user A brings out the mobile phone 500 to a remote place and views the content of the in-home HDD recorder 200 on a large-screen DTV 600 installed at the same remote place as where the mobile phone 500 is located. The DTV 600 has the same configuration as the DTV 100.

The steps in which the user A views the contents of the in-home HDD recorder 200 on the DTV 600 at the remote place are explained below with reference to FIG. 14.

As explained in the first embodiment above, the user A executes the remote access equipment authentication 900 in home beforehand between the HDD recorder (content transmission equipment) 200 and the mobile phone 500 to share the remote access key between them.

The user A, who has brought out the mobile phone 500 to a remote place (a hotel, for example) and intends to view the in-home contents on the DTV 600 at the same remote place, first executes the remote authentication process by acquiring the content information between the content transmission equipment 200 and the mobile phone 500 according to the same process as steps S1101 to S1118 shown in FIG. 11.

Figure 17:
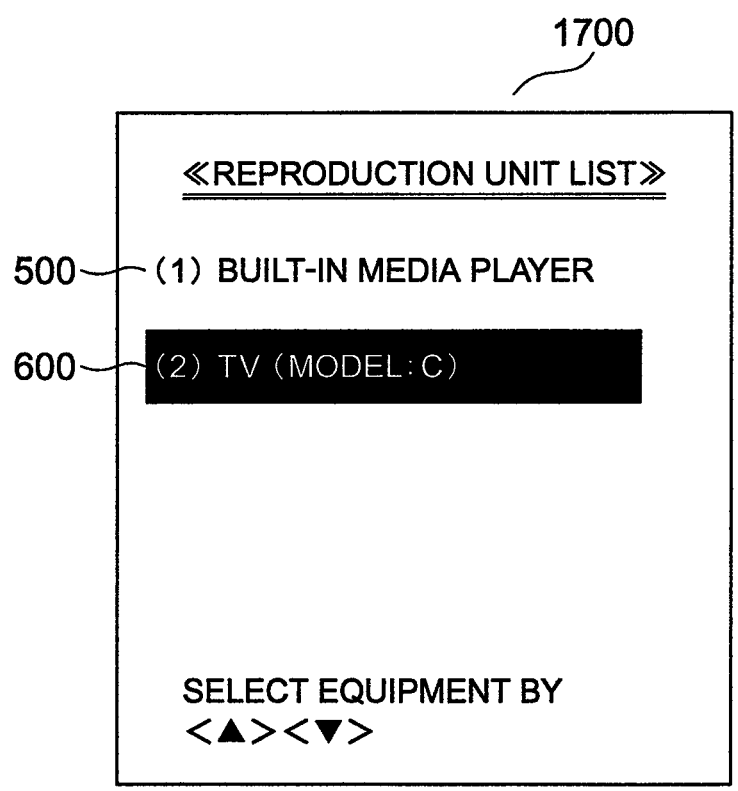
FIG. 17 shows an example of a content reproduction unit list screen of a mobile phone.

After the remote authentication process is successfully executed and the remote exchange key and the exchange key ID come to be shared by the content transmission equipment 200 and the mobile phone 500, the control unit 517 of the mobile phone (controller) 500 multicasts a UDP packet containing a "request to detect an equipment having the reproduction function" to all the equipments on the network, for example, and only the equipment that has the same function responds. By detecting whether other content reproduction unit exists on the network using a well-known technique such as DLNA, the content reproduction unit list screen (FIG. 17) is displayed on the display/speaker 505 in the presence of such content reproduction unit.

Once the user A selects a content reproduction unit (the DTV 600 in the case under consideration) on the list screen 1700 through the input processing unit 509, the control unit 517 sends a content viewing issue request to the DTV 600 (S1401). The content viewing issue request contains the information on the content to be viewed and the address information 1001 of the content transmission equipment 200 registered in the remote access information table 1000, and in some case, may be accompanied by the registration information 1002.

The DTV (content reception equipment) 600 that has received the content viewing issue request sends the acknowledgment to the controller 500 (S1402) and executes the normal authentication process 800 with the controller 500. In the process, the equipment authentication processing unit 510 of the controller 500 uses the remote exchange key shared with the content transmission equipment 200 in step S1116 and the ID thereof as a remote exchange key and an ID thereof, respectively, to be sent to the DTV 600 in step S819. As a result, the same exchange key and the ID thereof have successfully come to be shared among the content transmission equipment 200, the controller 500 and the content reception equipment 600.

After that, the DTV 600 sends a content viewing request to the content transmission equipment 200 (S1403). The content viewing request is accompanied by the ID of the remote exchange key. Also, in order to permit the content transmission equipment 200 to change the format or the image quality as required for content transmission, the content viewing request may contain the information on the data format (such as MPEG2-TS or H.264) and the image quality (such as HD, SD, 760p or 1080i) reproducible on the DTV 600. Such information, however, may be contained in another request issued than the content viewing request.

The control unit 211 of the content transmission equipment 200, upon reception of the content viewing request, sends the acknowledgment to the DTV 600 (S1404). The equipment authentication processing unit 202 checks that the ID of the remote exchange key is legitimate, and the device information updating unit 1082 starts by setting the timer 1081 in the device information management unit 203 in such a manner as to receive the notice periodically.

Also, the equipment authentication processing unit 202 generates a common key for content encryption using the remote exchange key and sets the common key in the encryption/decryption processing unit 206. The desired content read from the HDD 205 is encrypted by the encryption/decryption processing unit 206 while at the same time being sent to the DTV 600 (S1405). In the process, each time the notice is received from the timer 1081 during the content transmission, the device information updating unit 1082 updates the counter value 714 in the device information table 710.

The DTV 600 generates a common key for content decryption using the remote exchange key and sets the common key in the encryption/decryption processing unit 110. The contents received through the router 21 and the communication processing unit 111 are decrypted by the encryption/decryption processing unit 110 and output to the display/speaker 105 while being decoded by the decoder 104.

As described above, only in the case where the remote exchange key can be shared between the content transmission equipment and the controller brought out after being arranged in home beforehand to share the remote access key with the content transmission equipment, the controller can deliver the remote exchange key to the remote content reception equipment successfully authenticated in normal fashion.

As a result, the in-home contents can be safely viewed on the remote reception equipment without departing from the range of personal content use.

Embodiment 3

In the second embodiment described above, the remote exchange key required for content encryption is sent by the content transmission equipment 200 only to the controller 500. Therefore, the key exchange (normal authentication process 800) between the controller 500 and the content reception equipment 600 is not involved.

The feature of the third embodiment is that the controller 500 notifies the content transmission equipment 200 that the remote exchange key has been delivered to the content reception equipment 600.

With reference to FIGS. 18 and 19, the viewing process representing the feature of this embodiment is explained.

First, as shown in FIG. 18, the device information table 710 of the content transmission equipment 200 is provided with a substitute device ID 718 for setting the device ID of another equipment which receives the contents on behalf of the equipment indicated by the device ID 712 at the time of remote use. Further, a substitute address information (MAC address, IP address, etc.) and a substitute counter value may be added.

Next, the process in which the user A views the contents of the in-home HDD recorder 200 on the DTV 600 at a remote place 2 is explained with reference to FIG. 19.

Figure 14:
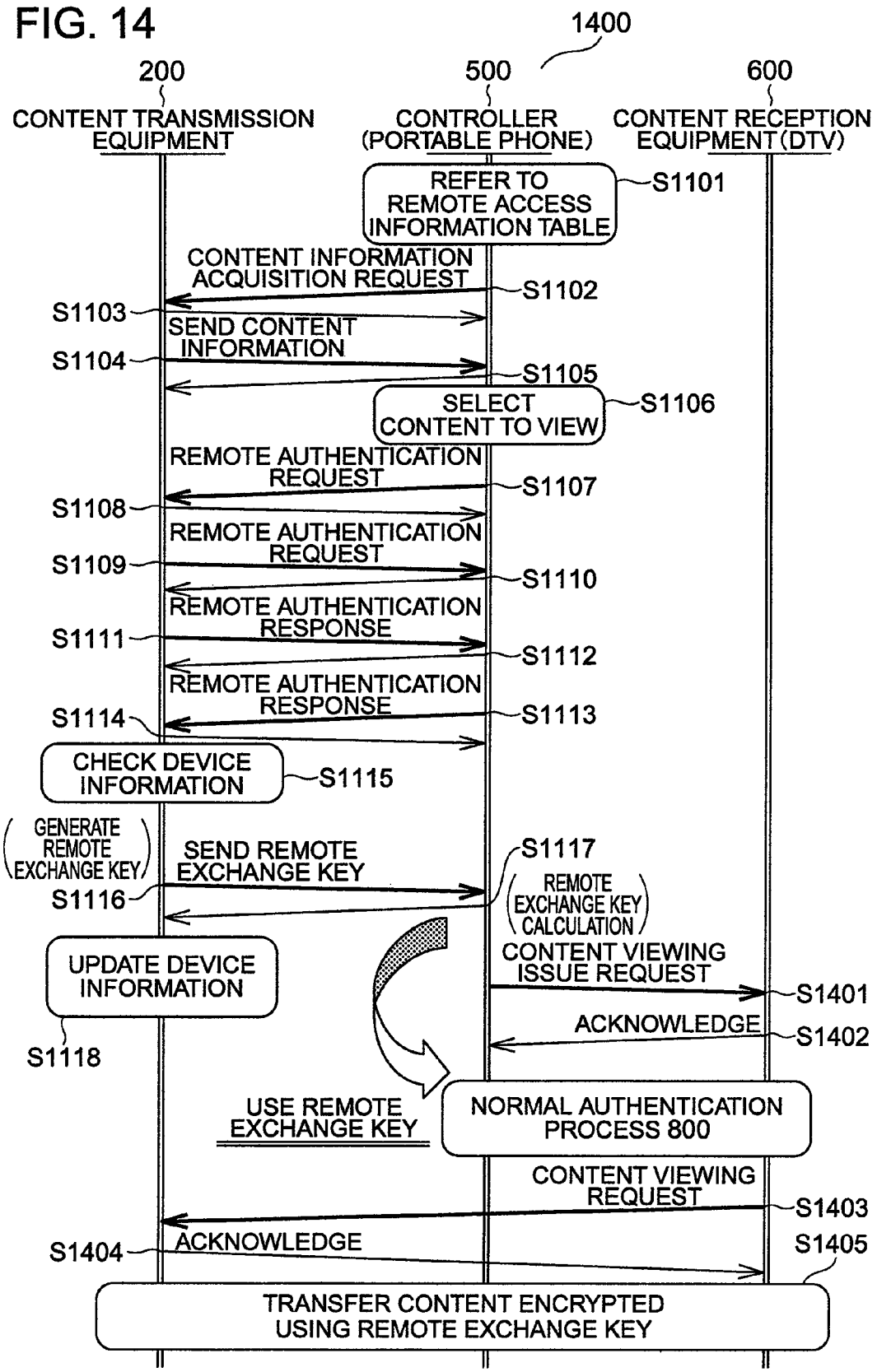
FIG. 14 shows an example of the sequence for executing the content transfer from a remote content reception equipment and an in-home content transmission equipment.

The process up to steps S1101 to S118 between the content transmission equipment 200 and the controller 500 is similar to the process shown in FIG. 14. Also, the process up to steps S1401 and S1402 between the controller 500 and the content reception equipment 600 and the process up to the equipment authentication process 800 are also similar to the corresponding processes shown in FIG. 14.

After that, the controller 500 issues, to the content transmission equipment 200, a remote equipment setting request to receive the contents using an authenticated remote equipment (the content reception equipment 600 in this case) in place of the controller 500 (S1900). The setting request contains the information on the content reception equipment 600 such as the device ID and the MAC address.

The content transmission equipment 200 that has received the remote equipment setting request sets the device ID of the content reception equipment 600 contained in the request, in the substitute device ID 718 of the device information table 710 (S1901), and issues the acknowledgment to the controller 500 (S1902).

After that, the content reception equipment 600 issues a content viewing request to the content transmission equipment 200 (S1403). In the process, the viewing request contains the device ID of the content reception equipment 600 or the address information (such as the MAC address or the IP address).

The content transmission equipment 200 that has received the content viewing request, after confirming that the request is issued from the substitute device ID 718, issues the acknowledgment to the content reception equipment 600 and transfers the encrypted content using the remote exchange key.

In the case where a content viewing request is received from the controller 500 of the device ID 712 during the content transmission to the content reception equipment 600 of the substitute device ID 718, then the content transmission to the content reception equipment 600 is suspended or the content viewing request is rejected. In the process, the content may be sent to only one equipment.

As described above, the in-home contents can be viewed safely on the remote content reception equipment without departing from the range of personal content use.

Although embodiments are described above, this invention is not limited to these embodiments, and it is apparent to those skilled in the art that the invention can be variously modified or altered without departing from the spirit and the scope of the appended claim of the invention.

The invention claimed is:

1. A content transmission equipment which transmits content to a content reception equipment, comprising:
   an input and output terminal;
   a communication processing unit configured to:
   transmit the content and a first control command as a source of the content to the content reception equipment via the input and output terminal, when the content reception equipment is connected from an in-home place to an in-home network to which the content transmission equipment is connected,
   receive a second control command from the content reception equipment via the input and output terminal, when the content reception equipment is connected from the in-home place to the in-home network to which the content transmission equipment is connected,
   transmit the content and the first control command as the source of the content to the content reception equipment via the same input and output terminal, when the content reception equipment is connected to the in-home network from a remote place via a remote network, and
   receive the second control command from the content reception equipment via the same input and output terminal, when the content reception equipment is connected to the in-home network from the remote place via the remote network;
   an authentication unit configured to execute a first authentication process and a second authentication process, the first authentication process authenticating the content reception equipment to share first key information with the content reception equipment via the communication processing unit when the content reception equipment is connected to the in-home network from the in-home place, the second authentication process authenticating the content reception equipment to share second key information with the content reception equipment via the communication processing unit when the content reception equipment is connected to the in-home network from the remote place via the remote network;
a timer configured to measure an elapsed time after the authentication unit transmits predetermined information to the content reception equipment until the authentication unit receives a response to the predetermined information, and configured to determine, based on the measured elapsed time, whether or not the content reception equipment is connected from the in-home place to the in-home network during the first authentication process;
a remote access information registration unit configured to register information on the content reception equipment when a remote access authentication request is received from the content reception equipment connected from the in-home place to the in-home network, with which the first key information is shared;
an encryption unit configured to execute an encryption process on the content of the content transmission equipment to be transmitted to the content reception equipment with key information generated based on the first key information or the second key information; and
a control unit configured to control the authentication unit, the timer, the remote access information registration unit, and the encryption unit,
wherein the control unit is configured to:
determine that the content reception equipment is at the remote place when receiving a remote authentication request from the content reception apparatus via the communication processing unit, control the authentication unit to execute the second authentication process with respect to the content reception equipment via the communication processing unit when it is determined that the content reception equipment is at the remote place and the information on the content reception equipment has been registered by the remote access information registration unit,
control the encryption unit to generate the key information based on the first key information to transmit the content encrypted with the key information generated based on the first key information when a first content transmission request is received from the content reception equipment which has been authenticated by the first authentication process of the authentication unit and shares the first key information, and
control the encryption unit to generate the key information based on the second key information to transmit the content encrypted with the key information generated based on the second key information when a second content transmission request is received from the content reception equipment connected to the in-home network from the remote place via the remote network, which has been authenticated by the second authentication process of the authentication unit and shares the second key information, wherein the control unit limits the number of content reception equipment terminals simultaneously accessible to the content transmission equipment to a predetermined number.

2. The content transmission equipment of claim 1, wherein the control unit discards the second key information upon complete transmission of the content encrypted with the key information generated based on the second key information to the content reception equipment, connected from the remote place via the networks, which has been authenticated by the second authentication process of the authentication unit and shares the second key information.

3. The content transmission equipment of claim 1, wherein the control unit rejects a particular content transmission request when the particular content transmission request requests a copy of the content of the content transmission equipment and the particular content transmission request is received from the content reception equipment connected from the remote place via the networks.

4. The content transmission equipment of claim 1, wherein the control unit controls the second key information shared only with the content reception equipment with respect to which the second authentication process is executed and not shared with any other content reception equipment.

5. The content transmission equipment of claim 1, wherein the control unit sends the content encrypted by the encryption unit with the key information generated based on the second key information to the content reception equipment which has been authenticated by the second authentication process of the authentication unit when the control unit receives, from the content reception equipment, the second content transmission request including information for identifying the second key information.

* * * * *